Patented Mar. 14, 1950

2,500,203

UNITED STATES PATENT OFFICE 2,500,203

SYNTHETIC LUBRICANTS

Orland M. Reiff, Harry J. Andress, Jr., and Alfred P. Kozacik, Woodbury, N. J., assignors to Socony-Vacuum Oil Company, Incorporated, a corporation of New York No Drawing. Application May 11, 1949, Serial No. 92,744

17 Claims. (Cl. 260—666)

This invention has to do with synthetic lubricants and with a process for their preparation. More particularly, this invention concerns a catalytic condensation of certain mono-olefins and styrene whereby low pour point lubricants are formed.

As is well known in the art, plastic compositions have been formed by copolymerization of unsaturated hydrocarbons with styrene. For example, copolymerization has been effected at low temperatures in the presence of active catalysts typified by boron trifluoride. Under such conditions as these high molecular weight, linear copolymers are formed. As shown in U. S. Letters Patent 2,274,749 these copolymers are viscosity index improving agents when incorporated, in small amounts, in mineral oils. Copolymers of a similar character have also been obtained by reaction of unsaturated hydrocarbons with styrene polymers (polystyrol), in the presence of clays impregnated with hydrogen fluoride or boron trifluoride (U. S. Letters Patent 2,282,456).

In co-pending application Serial No. 6,993, filed February 7, 1948, by F. M. Seger and A. N. Sachanen, a non-catalytic process for the preparation of synthetic lubricants is described. This non-catalytic process involves condensation of a straight-chain, normal alpha mono-olefin of five to twelve carbon atoms, with styrene at a temperature from about 500° F. to about 700° F. The lubricants obtained by this process are of excellent character, with low pour points, high viscosity indices and good stability. Unfortunately, however, condensation or copolymerization is generally incomplete and the synthetic lubricants contain polystyrenes, as evidenced by relatively high cloud points (+60° F.).

It has now been discovered that synthetic lubricants free from the undesirably high cloud points of the foregoing lubricants are obtained by a catalytic condensation of mono-olefins and styrene. The new lubricants have very low pour points, excellent stability and have a considerable range of viscosities. In sharp contrast with the copolymers referred to above in connection with 2,274,749 and 2,282,456, the products obtained by the present process do not behave as viscosity index improving agents when incorporated in mineral oils. The products formed in the present process have molecular weights of the order of 300 to 500, generally 340 to 470.

Reactants

The mono-olefins of this invention contain from eight to eighteen carbon atoms. Illustrative of such olefins are: octenes such as octene-1 and octene-2, nonenes as nonene-1, decenes such as decene-1, dodecene-1, hexadecene-1, octadecene-1, and the like. Preferred of such olefins, however, are the normal, alpha mono-olefins of ten to eighteen carbon atoms, particularly decene-1, dodecene-1, tetradecene-1, hexadecene-1, and octadecene-1 for such olefins form outstanding synthetic lubricants with styrene and its homologs.

Not only may the mono-olefins of the aforesaid character be used individually in this invention, but they may also be used in admixture with each other. Here again, however, mixtures containing a major proportion of one or more normal, alpha mono-olefins (or normal 1-olefins) are preferred. Representative mixtures are those obtained by the cracking of paraffin waxes and other paraffin products, and those obtained from the Fischer-Tropsch and related processes. The hydrocarbon mixtures may contain, in addition to the desired olefins, such materials as: other olefins, paraffins, naphthenes and aromatics.

As indicated above, styrene is condensed or copolymerized with the foregoing mono-olefins. In addition to styrene, however, homologs and derivatives of styrene may also be used. For example, alpha-methyl styrene has been found to form excellent synthetic lubricants in the present process. Other styrene derivatives include: p-chlorostyrene, p-methoxystyrene, p-alkylstyrenes as p-methylstyrene, etc. The substituent group or groups, such as chloro in p-chlorostyrene, generally modifies the character of the oil products, yet, in all cases, the products are characterized by desirably low pour points and are useful as lubricants. By way of illustration, when p-chlorostyrene is used, the synthetic lubricant formed possesses a high degree of film strength. Similarly, a fluoro-substituted styrene imparts additional stability to the synthetic lubricant product as well as film strength or extreme pressure properties. As will be noted from the character of the foregoing typical substituted styrenes, substituent groups which may be present are those which do not interfere with the condensation or copolymerization with the mono-olefin. In other words, a substituent group which may be present in the styrene is one which is substantially inert or unreactive in the condensation.

Similarly, vinyl-substituted polynuclear compounds may also be used in place of, or in combination with, styrene and the latter's homologs and derivatives. Representative vinyl-substituted polynuclear compounds are vinylnaphthalene, chloro vinylnaphthalene, vinylanthracene and the like.

It will be understood, of course, that mixtures of the aforesaid vinyl aromatic compounds, and their aforesaid derivatives, may be used in place of the individual reactant. Similarly, mixtures containing substantial, preferably major, proportions of one or more of said vinyl compounds may be used. Examples of such mixtures include: a crude styrene containing ethylbenzene, divinyl benzene and ethyl styrene.

Preferred of the vinyl aromatic compounds, in view of the outstanding character of the lubricants obtained therewith, is styrene.

Catalysts

The catalysts operative in the present process are porous, absorptive associations of silica and various amphoteric metal oxides, and particularly those of alumina, thoria and zirconia. They may be classified, for example, as active clay, and synthetic alumina-silica, thoria-silica and zirconia-silica catalysts. Preferred of these synthetic catalysts are those which contain an excess of silica with smaller amounts of alumina, thoria and zirconia; and which may or may not contain not more than one per cent of a third metal or metal oxide, with the exception of alkalies or alkaline earths which should not be present in amounts greater than approximately 0.1 per cent. The active clay catalysts should conform to these same specifications, except that they should contain not more than ten per cent of the oxides of calcium, magnesium and iron, not more than three per cent of said oxides being iron oxides. The amount of silica will generally vary from about 70 to 80 per cent and the amount of alumina for example, will vary from about 10 to 20 per cent by weight of the catalyst.

Illustrative catalysts are naturally - occurring silica-alumina clays of the montmorillonite type, fuller's earth, Attapulgus clay; synthetic porous absorptive composites comprising silica and alumina which may be formed in various ways, as for example, precipitating silica on alumina, or alumina on silica, or by combining a silica gel with alumina or by preparing a silica-alumina gel.

Synthetic silica-alumina catalysts may be prepared in numerous ways well known to the art by the formation of gels or gelatinous precipitates comprising essentially silica and alumina. A representative method of preparing such catalysts is described in U. S. Letters Patent 2,232,727, issued to Peterkin et al. Other particularly effective catalysts are spheroidal pellets of silica-alumina gel, prepared by mixing an acidic stream of aluminum sulphate and a stream of sodium silicate, and allowing the resulting sol to be ejected from a nozzle into an oil column where the gel sets in the form of bead-like pellets. The resulting gel spheres—after washing, drying and tempering—were found to be excellent catalysts in the present process. A further description of the method for preparing the above-described spheroidal pellets is disclosed in U. S. Letters Patent 2,384,946, issued September 18, 1945 to Milton M. Marisic.

The catalyst, whether a natural clay or a synthetic composite, should preferably have a fairly small particle size. After use in the condensation herein, the spent catalyst may be reactivated at elevated temperatures for a period sufficient to restore its original activity. Thus, a spent silica-alumina catalyst may be reactivated by heating at about 1000° F. for about two hours. The original catalyst may therefore be reused a considerable number of times before it degenerates completely and must be discarded.

Reaction conditions

Copolymerization of the aforesaid reactants is effected at elevated temperatures. It appears that temperatures as low as 300° F. and as high as 600° F. may be used. At temperatures from 300° F. to 400° F., however, reaction rate is slow; and, at temperatures above 600° F., undesirable side reactions, such as cracking, take place resulting in lower yields of oils of high flash point. Preferred operating temperatures, therefore, range from 400° F. to 500° F.

Condensation is generally complete in from four to ten hours, preferably four to seven hours, with the higher reaction temperatures being used for the shorter reaction periods and with the lower reaction temperatures being used for the longer reaction periods.

Pressures ranging from atmospheric to about 300 pounds per square inch characterize the process. In general, it is desirable to use sufficient pressure to maintain the reactants in liquid state.

Proportions of reactants can be varied considerably to form products suitable for different uses. With equimolar proportions of mono-olefin and styrene, the products are principally of the copolymer type as evidenced by a low degree of unsaturation. A higher proportion of the mono-olefin than that corresponding to a 1:1 molar ratio, provides products of higher viscosity index (V. I.), lower viscosity and lower pour point, which products are considered to be mixtures of polymerized mono-olefins and copolymers. In general, therefore, the molar proportion of mono-olefin to vinyl aromatic compound, such as styrene, will range from 1:1 to 2:1, preferably about 1:1.

It will be understood that the condensation is aided by providing mixing of the reactants. This may be provided by using various agitating means which are well known in the art. At the reaction conditions, the reactants are readily soluble and homogeneity is easily obtained.

Examples

In order to illustrate the principles of this invention, the results of a series of typical, and non-limiting, condensations are set forth in tabular form in Table I below. These condensations, with the exception of run 16, were carried out in a rocking-type bomb (American Instrument Co.). The reactants and catalyst were charged to the bomb, which was then heated to the desired temperature for the desired length of time. Thereafter, the bomb was cooled and discharged. The contents of the bomb were suction-filtered in order to remove catalyst, and the filtrate was vacuum distilled to remove any unreacted materials and products of intermediate boiling range. To distinguish the condensation products from the distillate fractions, the refined oils are identified as "residual oils." The latter term identifies the oils from which unreacted materials and products of intermediate boiling range have been separated.

In the case of run 16, an autoclave equipped with a stirrer was used rather than a rocking-type bomb.

It should be noted that the reaction times, recited as "time, hours" in Table I, represent the time intervals during which the bomb or autoclave and its contents was maintained at the desired temperature, and do not include the time intervals necessary to heat the reaction vessel and its contents to the desired temperature, and also do not include the time intervals necessary to cool and/or discharge the reaction vessel after heat to the vessel has been discontinued. As a guide, however, about three hours were generally required to heat the bomb from about 70° F. to 500° F., and about four hours were required to cool the bomb from 500° F. to 70° F. and to discharge the bomb.

Styrene used in these condensations contained a fraction of one per cent of p-tertiary-butylcatechol, the latter acting as a stabilizer or polymerization inhibitor. This styrene material is a commercial product now available.

By way of illustration, the procedure followed in run 4 of Table I, below, is provided in detail. A mixture of 208 parts by weight (2 molar proportions) of styrene, 224 parts by weight (2 molar proportions) of octene-1 and 43 parts by weight of a synthetic silica-alumina catalyst formed by pelleting (analysis: 87.5% silica, 12.5% alumina), was charged to a stainless steel, rocking-type bomb. After the bomb head was secure, approximately 1,800 pounds per square inch of nitrogen was pressured into the bomb to check for leaks. The pressure was then released, the system was again closed and the bomb was heated to 500° F. in the course of six hours and held at that temperature for six hours. During the reaction, a pressure of 150 pounds per square inch developed. After cooling the bomb to room temperature (70° F.), during a period of four hours, the reaction product was discharged into a vessel and diluted with benzene. The benzene-diluted product was then suction filtered to remove the catalyst. Benzene was removed from the filtrate by distilling the latter at atmospheric pressure to a maximum temperature of 125° C. The benzene-free product was then vacuum distilled, vacuum of 5 mms. of Hg, to a liquid temperature of 100° C., whereupon any unreacted material and products of intermediate boiling range were removed. The residual oil, 231.5 parts by weight, falls within the lubricating oil range.

*Table I*

| Run No. | Reactants | | | | | | Reaction Conditions | | | |
|---|---|---|---|---|---|---|---|---|---|---|
| | Olefin | Parts by Weight | Moles | Vinyl Aromatic Compound | Parts by Weight | Moles | Catalyst | Parts by Weight | Temp., °F. | Time, Hrs. |
| 1 | Pentene-2 | 223 | 3.2 | Styrene | 300 | 2.9 | Synthetic B, Alumina-Silica | 52 | 400 | 6½ |
| 2 | Pentenes A | 202 | 2.8 | ...do | 300 | 2.9 | ...do | 50 | 400 | 6½ |
| 3 | ...do A | 405 | 5.8 | ...do | 300 | 2.9 | ...do | 100 | 375-400 | 6½ |
| 4 | Octene-1 | 224 | 2.0 | ...do | 208 | 2.0 | ...do | 43 | 500 | 6 |
| 5 | Di-isobutylene | 224 | 2.0 | ...do | 208 | 2.0 | ...do | 43 | 500 | 6 |
| 6 | Dodecene-1 | 164 | 0.98 | ...do | 104 | 1.0 | ...do | 27 | 500 | 6¾ |
| 7 | ...do | 164 | 0.98 | ...do | 52 | 0.5 | ...do | 22 | 500 | 4¾ |
| 8 | Unsaturated Kerosene C | 250 | 1.3 | ...do | 43 | 0.4 | ...do | 30 | 400 | 7 |
| 9 | ...do | 250 | 1.3 | ...do | 21.5 | 0.2 | ...do | 30 | 400 | 7 |
| 10 | Hexadecene-1 | 224 | 1.0 | ...do | 104 | 1.0 | ...do | 33 | 500 | 5 |
| 11 | Octadecene-1 | 126 | 0.5 | ...do | 52 | 0.5 | ...do | 17.8 | 500 | 5½ |
| 12 | ...do | 126 | 0.5 | ...do | 26 | 0.25 | ...do | 15.2 | 500 | 6½ |
| 13 | ...do | 252 | 1.0 | Alpha-methyl styrene | 118 | 1.0 | ...do | 58 | 500 | 6 |
| 14 | Octadecene F | 103 | 0.4 | Styrene | 42.5 | 0.4 | ...do | 14.6 | 500 | 6 |
| 15 | Octadecene-1 | 252 | 1.0 | ...do | 104 | 1.0 | ...do H | 35.6 | 500 | 6 |
| 16 | Unsaturated Wax D | 266 | 0.95 | ...do | 92 | 0.88 | ...do B | 50 | 346 | 6 |
| 17 | ...do E | 400 | 1.4 | ...do | 140 | 1.3 | ...do | 54 | 400 | 7 |

| Run No. | Residual oil | | | | | | | | | |
|---|---|---|---|---|---|---|---|---|---|---|
| | Max. Press. (p.s.i.) | Parts by Weight | Weight Per Cent Yield | Molecular Weight | Pour Point, °F. | K.V. @ 100° F., Cs. | K.V. @ 210° F., Cs. | V.I. | Cloud Point, °F. | Iodine No. | A.P.I. Gravity |
| 1 | | 307 | 58.7 | | 85 | 4284 (130° F.) | 95.45 | | | 5.9 | |
| 2 | 250 | 273 | 54.1 | 469 | | | | | | 6 | |
| 3 | | 143 | 20.3 | 342 | 30 | 585.8 | 13.47 | <0 | | | |
| 4 | 150 | 231 | 53.5 | | -10 | 329.8 | 13.8 | <0 | | 6.2 | 12.2 |
| 5 | 265 | 284 | 65.7 | | -5 | 140.1 | 6.95 | <0 | | 20.3 | 15.3 |
| 6 | 50 | 205 | 76.2 | | -20 | 142.7 | 11.74 | 70.7 | | 2.7 | 21.1 |
| 7 | 0 | 165 | 76.1 | 421 | -30 | 107.1 | 10.70 | 89.8 | <-34 | 13.3 | 25.5 |
| 8 | | 121 | 41.3 | | 10 | 321.3 | 14.18 | <0 | | | |
| 9 | | 100 | 35.8 | | -15 | 141.1 | 10.31 | 39 | | | |
| 10 | 50 | 257 | 78.0 | | -20 | 27.32 | 4.97 | 119.8 | | | |
| 11 | 35 | 154 | 86.5 | | 10 | 46.22 | 7.08 | 119.7 | | 2.6 | 28.5 |
| 12 | 80 | 116 | 76.3 | | 15 | 67.69 | 9.54 | 123.5 | | | |
| 13 | 80 | 188 | 50.8 | | 5 | 23.95 | 4.64 | 125.3 | | 33 | 30.6 |
| 14 | | 102 | 70.1 | 366 | 0 | 79.18 | 9.53 | 106 | -16 | G14.4 | 26.3 |
| 15 | 20 | 326 | 91.5 | 397 | 15 | 50.55 | 7.59 | 120.5 | 12 | 8.4 | 28.9 |
| 16 | Atm. | 320 | 89.3 | 423 | 75 | 61.3 | 8.96 | 125 | | 46 | 27.1 |
| 17 | 60 | 369 | 68.4 | 370 | 70 | 96.8 | 11.48 | 112.7 | | 60 | 24.3 |

Notes on Table I:
A = A mixture of pentenes, boiling range, 32° C. to 60° C.
B = A synthetic alumina-silica catalyst formed by pelleting, and comprising approximately 12.5 per cent alumina and 87.5 per cent silica.
C = An unsaturated kerosene fraction having an iodine number of 42 and an average carbon chain length of 14; prepared by dehydrohalogenation of a chlorokerosene of 17.6 per cent chlorine content.
D = An unsaturated paraffin wax having an iodine number of 96 and an average carbon chain length of 20; prepared by dehydrohalogenation of a chlorowax of 14 per cent chlorine content.
E = An unsaturated paraffin wax having an iodine number of 152 and an average carbon chain length of 20; prepared by dehydrohalogenation of chlorowax of 20 per cent chlorine content.
F = Isomerized octadecene-1 free from the latter olefin, having a bromine number of 63.1 and a refractive index of 1.4460 ($n_D^{20}$).
G = Calculated from corresponding bromine number of 9.1.
H = Synthetic alumina-silica catalyst in finely divided form and containing approximately ten per cent alumina and ninety per cent silica.

A number of observations may be made from the data set forth in Table I, above. Runs 1-3 reveal that oils obtained with pentenes have relatively high pour points and have low viscosity indices. The chain length of the mono-olefins, pentenes, is believed to be inadequate. Similarly, runs 16 and 17 demonstrate that high pour point oils are obtained when mono-olefins of twenty carbon chain length are used, evidence that the carbon chain is excessively long. In contrast are runs 4-15 which illustrate the present invention. In the latter runs, the oils obtained are of low pour point, from +15° F. to −30° F.

Runs 4-5 reveal that low pour point oils are obtained with octenes as the mono-olefin reactant, and also reveal that such oils have low viscosity indices. These oils are well suited for applications wherein low pour point is essential and wherein viscosity index is of no consequence. For example, these oils may be used as blending stocks for other oils.

The oils obtained from dodecene-1 in runs 6 and 7 illustrate the difference in properties which may be realized by varying the mol ratio of dodecene-1 and styrene. When less styrene is used (run 7), the oil product formed has a higher viscosity index and a lower pour point.

Runs 8 and 9 were made with olefins having an average carbon chain length of fourteen. These olefins are mixtures with the double bond in alpha, beta or gamma position, and with some cycloparaffin nuclei present. It is considered that the relatively low viscosity indices of the oil products may be attributed to the complexity of the olefins, rather than to their carbon chain lengths. With an individual olefin of the same chain length, particularly a normal, alpha mono-olefin, the oils formed therefrom would be characterized by considerably higher viscosity indices. It is to be noted from runs 8 and 9, however, that V. I. is higher when higher molar proportion of olefin to styrene than 1:1 is used.

Hexadecene-1 is the mono-olefin reactant of run 10, offering a comparison with octene-1 of run 4 and with dodecene-1 of run 6. While there is no great difference in the pour points of the oils obtained with these three olefins, there is a considerable difference in V. I., with the oil obtained from hexadecene-1 being outstanding.

Runs 11-15 involve octadecenes and serve to illustrate several relationships. Run 11 with octadecene-1 and run 14 with isomers of this olefin reveal that an oil of somewhat lower pour point is obtained with a non-1-olefin though such an oil is characterized by a lower V. I. Runs 12 and 13 show that an oil of somewhat lower pour point is obtained with alpha-methyl styrene than with styrene; however, styrene is considerably more reactive and a higher yield is realized than with the methyl derivative. Runs 11 and 15 indicate that the catalyst pellets and bead fines are of about the same order of effectiveness.

As indicated hereinabove, the residual oils of this invention do not behave as viscosity index (V. I.) improving agents for lubricating oils, in contrast to products obtained by copolymerizing unsaturated hydrocarbons with styrene in the presence of boron trifluoride and the like. The behavior of several representative residual oils, incorporated in a mineral lubricating oil in relatively low concentration, is provided in Table II below. By way of comparison, two representative commercial V. I. agents in typical lubricants are also shown in Table II.

Table II

| Residual Oil, Run No. | Conc., Percent, in Mineral Oil | Kinematic Viscosity | | V. I. | Change in V. I. |
| --- | --- | --- | --- | --- | --- |
| | | 100° F., cs. | 210° F., cs. | | |
| 7 | 5 | 30.37 | 4.79 | 76.9 | |
| 14 | 5 | 32.13 | 4.69 | 79.4 | +2.5 |
| 15 | 5 | 31.07 | 4.89 | 81.3 | +4.4 |
| | 5 | 31.82 | 4.93 | 79.0 | +2.1 |
| | 1 | 48.73 | 6.16 | 72.5 | |
| X | 1 | 67.89 | 8.30 | 99.5 | +27.0 |
| Y | 1 | 61.1 | 7.90 | 103.2 | +30.7 |
| | 1 | 116.5 | 11.96 | 99 | |
| X | 1 | 148.2 | 14.88 | 107 | +8 |
| Y | 1 | 136.6 | 14.44 | 111 | +12 |
| | 1 | 35.5 | 5.70 | 110.2 | |
| X | 1 | 48.17 | 7.43 | 122.8 | +12.6 |
| Y | 1 | 43.22 | 7.10 | 129.1 | +18.9 |

X and Y are commercial viscosity index agents.

As will be evident from the data presented above in Table I, the condensation products of this invention are highly desirable lubricants per se. They are also of considerable value as blending agents for other lubricating oils. Typical oils with which the synthetic oils may be blended are mineral oils such as are normally used in internal combustion and turbine engines. When so blended, the synthetic oils may comprise the major proportion of the final blended oil, or may even comprise a minor proportion thereof.

One or more of the individual properties of the synthetic lubricants of this invention may be further improved by incorporating therewith a small, but effective amount, of an addition agent such as an antioxidant, a detergent, an extreme pressure agent, a foam suppressor, a viscosity index (V. I.) improver, etc. Antioxidants are well-known in the art, and are generally characterized by phosphorus, sulfur, nitrogen, etc. content; representative of such materials is an oil-soluble, phosphorus- and sulfur-containing reaction product of pinene and phosphorus pentasulfide. Typical detergents which may be so used are metal salts of alkyl-substituted aromatic sulfonic or carboxylic acids, as illustrated by diwax benzene barium sulfonate and barium phenate, barium salt of a wax-substituted phenol carboxylic acid. Extreme pressure agents are well known; illustrating such materials are numerous chlorine and/or sulfur containing compositions, one such material being a chlornaphtha xanthate. Silicones, such as dimethyl silicone, may be used to illustrate foam suppressing compositions. Viscosity index improving agents which may be used are typified by polypropylenes, polyisobutylenes, polyacrylate esters, and the like.

Contemplated also as within the scope of this invention is a method of lubricating relatively moving surfaces by maintaining therebetween a film consisting of any of the aforesaid oils.

It is to be understood that the foregoing description and representative examples are non-limiting and serve to illustrate the invention, which is to be broadly construed in the light of the language of the appended claims.

We claim:

1. The method of preparation of a viscous oil having a low pour point and a low cloud point, which comprises: heating a charge consisting essentially of a mono-olefin having between about eight and about eighteen carbon atoms per molecule and a vinyl aromatic compound, in the presence of a catalyst comprising an association of silica and an amphoteric metal oxide, at a temperature between about 300° F. and about 600° F. for a period of time sufficient to effect condensation of said mono-olefin and said vinyl aromatic compound, the charge containing from about one to about two molar proportions of said mono-olefin per molar proportion of said vinyl aromatic compound.

2. The method of claim 1 wherein the temperature is between about 400° F. and about 500° F.

3. The method of claim 1 wherein the mono-olefin contains between about ten and about eighteen carbon atoms per molecule.

4. The method of claim 1 wherein the mono-olefin is a normal, alpha mono-olefin.

5. The method of claim 1 wherein the vinyl aromatic compound is a mono-vinyl benzene.

6. The method of claim 1 wherein the catalyst is a porous absorptive activated silica-alumina clay.

7. The method of claim 1 wherein the catalyst is a porous absorptive synthetic silica-alumina composite.

8. An oil of lubricating viscosity having a low pour point and a low cloud point, and obtained: by heating a charge consisting essentially of a mono-olefin having between about eight and about eighteen carbon atoms per molecule and a vinyl aromatic compound, in the presence of a catalyst comprising an association of silica and an amphoteric metal oxide, at a temperature between about 300° F. and about 600° F. for a period of time sufficient to effect condensation of said mono-olefin and said vinyl aromatic compound, the charge containing from about one to about two molar proportions of said mono-olefin per molar proportion of said vinyl aromatic compound.

9. The oil of claim 8 wherein the temperature is between about 400° F. and about 500° F.

10. The oil of claim 8 wherein the mono-olefin contains between about ten and about eighteen carbon atoms per molecule.

11. The oil of claim 8 wherein the mono-olefin is a normal, alpha mono-olefin.

12. The oil of claim 8 wherein the vinyl aromatic compound is a mono-vinyl benzene.

13. The oil of claim 8 wherein the catalyst is a porous absorptive activated silica-alumina clay.

14. The oil of claim 8 wherein the catalyst is a porous absorptive synthetic silica-alumina composite.

15. An oil of lubricating viscosity having a low pour point and a low cloud point, and obtained by: heating a charge consisting essentially of n-dodecene-1 and styrene in substantially equimolar proportions, in the presence of a porous absorptive synthetic silica-alumina composite comprising about 87.5 per cent silica and about 12.5 per cent alumina, at about 500° F. for about seven hours.

16. An oil of lubricating viscosity having a low pour point and a low cloud point, and obtained by: heating a charge consisting essentially of n-hexadecene-1 and styrene in substantially equimolar proportions, in the presence of a porous absorptive synthetic silica-alumina composite comprising about 87.5 per cent silica and about 12.5 per cent alumina, at about 500° F. for about five hours.

17. An oil of lubricating viscosity having a low pour point and a low cloud point, and obtained by: heating a charge consisting essentially of n-octadecene-1 and alpha-methyl styrene in substantially equimolar proportions, in the presence of a porous absorptive synthetic silica-alumina composite comprising about 87.5 per cent silica and about 12.5 per cent alumina, at about 500° F. for about six hours.

ORLAND M. REIFF.
HARRY J. ANDRESS, Jr.
ALFRED P. KOZACIK.

REFERENCES CITED

The following references are of record in the file of this patent:

UNITED STATES PATENTS

| Number | Name | Date |
| --- | --- | --- |
| 2,368,110 | Buell | Jan. 30, 1945 |
| 2,401,865 | Gorin et al. | June 11, 1946 |
| 2,442,644 | Elwell et al. | June 1, 1948 |
| 2,474,881 | Young et al. | July 5, 1949 |